US008560544B2

(12) United States Patent
Kamath et al.

(10) Patent No.: US 8,560,544 B2
(45) Date of Patent: Oct. 15, 2013

(54) CLUSTERING OF ANALYTIC FUNCTIONS

(75) Inventors: Monty Ravindra Kamath, Westlake, OH (US); Alexander Pikovsky, Lexington, MA (US)

(73) Assignee: International Business Machines Corporation, Armonk, NY (US)

( * ) Notice: Subject to any disclaimer, the term of this patent is extended or adjusted under 35 U.S.C. 154(b) by 389 days.

(21) Appl. No.: 12/882,824

(22) Filed: Sep. 15, 2010

(65) Prior Publication Data

US 2012/0066224 A1 Mar. 15, 2012

(51) Int. Cl.
*G06F 7/00* (2006.01)
*G06F 17/30* (2006.01)

(52) U.S. Cl.
USPC .......................................... 707/737

(58) Field of Classification Search
USPC ........................................ 707/737, 999.002
See application file for complete search history.

(56) References Cited

U.S. PATENT DOCUMENTS

| | | | |
|---|---|---|---|
| 5,884,037 A | 3/1999 | Aras et al. | |
| 6,125,105 A | 9/2000 | Edwards et al. | |
| 6,496,831 B1 | 12/2002 | Baulier et al. | |
| 6,502,133 B1 | 12/2002 | Baulier et al. | |
| 6,604,114 B1 | 8/2003 | Toong et al. | |
| 6,839,754 B2 | 1/2005 | Nowak et al. | |
| 6,895,397 B2 | 5/2005 | Nagamura et al. | |
| 6,925,492 B2 | 8/2005 | Shirriff | |
| 7,069,514 B2 | 6/2006 | DeMesa et al. | |
| 7,124,055 B2 | 10/2006 | Breiman | |
| 7,200,530 B2 | 4/2007 | Brown et al. | |
| 7,280,988 B2 | 10/2007 | Helsper et al. | |
| 7,406,200 B1 | 7/2008 | Syeda-Mahmood et al. | |
| 7,415,453 B2 | 8/2008 | Suzuki et al. | |
| 7,509,234 B2 | 3/2009 | Unnikrishnan et al. | |
| 7,526,461 B2 | 4/2009 | Srinivasa et al. | |
| 7,617,303 B2 | 11/2009 | Duggirala | |
| 7,742,959 B2 | 6/2010 | Müller | |
| 7,747,641 B2 | 6/2010 | Kim et al. | |
| 2001/0013008 A1 | 8/2001 | Waclawski | |
| 2002/0049838 A1 | 4/2002 | Sylor et al. | |
| 2002/0062368 A1 | 5/2002 | Holtzman et al. | |
| 2002/0069281 A1 | 6/2002 | Dillenberger et al. | |
| 2002/0143935 A1 | 10/2002 | Schenkel et al. | |
| 2002/0152305 A1 | 10/2002 | Jackson et al. | |
| 2003/0023600 A1* | 1/2003 | Nagamura et al. .............. | 707/10 |

(Continued)

OTHER PUBLICATIONS

Hovey et al; "Evolution of Optimal Compute Server Clusters for Dynamic Load-balancing Systems", The 2003 Congress on Evolutionary Computation, 2003. CEC'03., vol. 1, pp. 528-535 vol. 1.

*Primary Examiner* — Aleksandr Kerzhner
(74) *Attorney, Agent, or Firm* — Garg Law Firm, PLLC; Rakesh Garg; Prentiss W. Johnson

(57) ABSTRACT

A method, system, and computer program product for improved clustering of analytic functions in a data processing environment are described. A set of instances of an analytic function receiving data input from a set of data sources is identified. A first subset of instances is configured to receive input from a first subset of data sources, and a second subset of instances is configured to receive input from a second subset of data sources. The set of instances is assigned to a cluster. The cluster begins executing in a computer in the data processing environment, when the first subset of data sources begins transmitting time series data input to the first subset of instances in the cluster.

20 Claims, 5 Drawing Sheets

(56) References Cited

U.S. PATENT DOCUMENTS

| | | |
|---|---|---|
| 2003/0023719 A1 | 1/2003 | Castelli et al. |
| 2003/0074251 A1 | 4/2003 | Kumar et al. |
| 2004/0024773 A1 | 2/2004 | Stoffel et al. |
| 2004/0083389 A1 | 4/2004 | Yoshida |
| 2004/0155899 A1 | 8/2004 | Conrad |
| 2005/0091361 A1 | 4/2005 | Bernstein et al. |
| 2005/0102193 A1 | 5/2005 | Day et al. |
| 2005/0138164 A1 | 6/2005 | Burton et al. |
| 2006/0025985 A1 | 2/2006 | Vinberg et al. |
| 2006/0056436 A1 | 3/2006 | Horikawa |
| 2006/0277283 A1 | 12/2006 | Bower, III et al. |
| 2006/0294238 A1 | 12/2006 | Naik et al. |
| 2007/0130208 A1 | 6/2007 | Bornhoevd et al. |
| 2007/0150599 A1 | 6/2007 | Neogi et al. |
| 2007/0214262 A1 | 9/2007 | Buchbinder et al. |
| 2007/0271560 A1 | 11/2007 | Wahlert et al. |
| 2008/0027920 A1* | 1/2008 | Schipunov et al. ............... 707/4 |
| 2008/0209434 A1 | 8/2008 | Queck et al. |
| 2008/0222287 A1 | 9/2008 | Bahl et al. |
| 2009/0006309 A1* | 1/2009 | Hunt et al. .................... 707/1 |
| 2009/0248722 A1 | 10/2009 | Pikovsky et al. |
| 2009/0248851 A1* | 10/2009 | Pikovsky et al. ............ 709/224 |
| 2010/0262467 A1 | 10/2010 | Barnhill, Jr. et al. |

* cited by examiner

CLUSTERING OF ANALYTIC FUNCTIONS

RELATED APPLICATION

The present invention is related to similar subject matter of co-pending and commonly assigned U.S. patent application Ser. No. 12/056,890 entitled "CLUSTERING ANALYTIC FUNCTIONS," filed on Mar. 27, 2008, which is hereby incorporated by reference.

BACKGROUND OF THE INVENTION

1. Field of the Invention

The present invention relates generally to an improved data processing system, and in particular, to a computer implemented method, system and computer program product for improved clustering of analytic functions in the performance of data analysis.

2. Description of the Related Art

Present data processing environments include a collection of hardware, software, firmware, and communication pathways. Management, administration, operation, repair, update, expansion, or replacement of elements in a data processing environment relies on data collected from various points in the data processing environment.

Furthermore, the various elements of a data processing environment often include components of their own. Various systems, applications, or functions may collect data at or about the various components. For example, a management system may collect data from components to gain insight into the operation, control, performance, troubles, and many other aspects of the data processing environment.

Each element or component can be a source of data that is usable in this manner. The number of data sources in some data processing environments can be in the thousands or millions, to give a sense of scale.

Furthermore, not only is the data collected from a vast number of data sources, a variety of data analyses often has to be performed using various analytic functions on a combination of such data. A software component or another element of the data processing environment may implement an analytic function to perform a particular analysis. Many instances of similar functions may simultaneously execute to analyze similar data from different sources or similar data pertaining to different resources. In some data processing environments, the number of analytic function instances can range in the millions.

Additionally, a particular analysis may be relevant to a particular part of the data processing environment, or use data sources situated in a particular set of data processing environment elements. Consequently, the various functions performing the analyses may be distributed across the data processing environment, such as to be close to their respective data sources. Analytic functions may further communicate and interact with each other to provide certain analysis or information.

SUMMARY OF THE INVENTION

The illustrative embodiments provide a method, system, and computer program product for improved clustering of analytics functions. Embodiments identify a set of instances of an analytic function receiving data input from a set of data sources. A first subset of instances is configured to receive input from a first subset of data sources, and a second subset of instances is configured to receive input from a second subset of data sources. The embodiments assign the set of instances to a cluster. The embodiments begin executing the cluster in a computer in the data processing environment, when the first subset of data sources begins transmitting time series data input to the first subset of instances in the cluster.

BRIEF DESCRIPTION OF THE DRAWINGS

The novel features characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
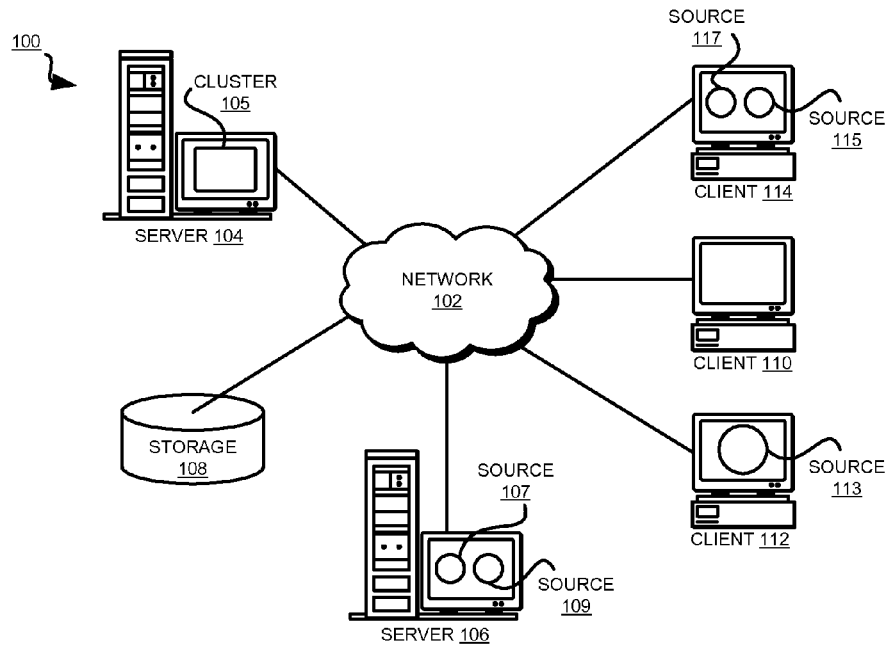
FIG. 1 depicts a pictorial representation of a network of data processing systems in which illustrative embodiments may be implemented.

An analytic function specification is a code, pseudo-code, scheme, program, or procedure that describes an analytic function. An analytic function instance is an instance of an analytic function, described by an analytic function specification, and executing in an environment.

An instance of a resource is a copy of the resource, and each instance of a resource is called an object. An instance of an analytic function may also be an object. An object may be a data source. Data emitted by a data source is also called a time series.

In statistics, signal processing, and many other fields, a time series is a sequence of data points, measured typically at successive times, spaced according to uniform time intervals, other periodicity, or other triggers. An input time series is a time series that serves as input data. An output time series is a time series that is data produced from some processing. A time series may be an output time series of one object and an input time series of another object.

As objects have relationships with other objects, analytic function instances can depend on one another. For example, one instance of a particular analytic function may use as an input time series, an output time series of an instance of another analytic function.

In smaller data processing environments, such as those including hundreds of analytic function instances and data sources, the locations of the analytic functions and sources may not significantly affect system performance. In some cases, the number of analytic functions instances and data sources can be significantly higher. In such circumstances, efficient execution of the analytic functions requires associating a particular analytic function with the particular data sources that supply the time series for that analytic function. In such a configuration, the analytic function can trigger operation as soon as the time series is available from the associated data source.

The invention recognizes that forming such associations leads to other problems. For example, by forming such associations between analytic functions and their data sources can lead to an explosion of clusters. A cluster is a process within which an analytic function instance executes. A cluster is also known as a label in certain environments.

In other words, each association between an analytic function and a data source essentially spawns a new process and for only a few hundred data sources and a few hundred analytic functions the various combinations of functions and sources can spawn millions of clusters.

The invention recognizes that having an explosion of clusters in this manner drains computing resources. With a finite amount of computing resources available in a given data processing environment, and with an increasing number of clusters with each association, the computing resources may become exhausted or depleted. The computing resource depletion may reach a point that contentions for the computing resources actually deteriorate performance, contrary to the intent behind forming the associations in the first place.

To address these and other problems related to using analytic functions, the illustrative embodiments provide a method, system, and computer program product for improving the clustering of analytic functions. The illustrative embodiments may be used in conjunction with any application or any environment that may use analytics, including but not limited to data processing environments.

The illustrative embodiments are described with respect to data, data structures, events, or identifiers only as examples. Such descriptions are not intended to be limiting on the invention. For example, an illustrative embodiment described with respect to one time series may be implemented using a combination of several time series in a similar manner within the scope of the invention.

Furthermore, the illustrative embodiments may be implemented with respect to any type of data processing system. For example, an illustrative embodiment described with respect to an application in a data processing system may be implemented with respect to one or more applications executing in a distributed data processing environment within the scope of the invention. As another example, an embodiment of the invention may be implemented with respect to any type of client system, server system, platform, or a combination thereof.

The illustrative embodiments are further described with respect to certain parameters, attributes, and configurations only as examples. Such descriptions are not intended to be limiting on the invention. For example, an illustrative embodiment described with respect to clustering analytic function instances according to one condition may be implemented using a different clustering condition in a similar manner within the scope of the invention.

An application implementing an embodiment may take the form of data objects, code objects, encapsulated instructions, application fragments, drivers, routines, services, systems—including the basic I/O system (BIOS), and other types of software implementations available in a data processing environment. For example, Java Virtual Machine (JVM), Java object, an Enterprise Java Bean (EJB), a servlet, or an applet may be manifestations of an application with respect to which, within which, or using which, the invention may be implemented. (Java, JVM, EJB, and other Java related terms are trademarks of Sun Microsystems, Inc. or Oracle Corporation, in the United States, other countries, or both.)

An illustrative embodiment may be implemented in hardware, software, or a combination thereof. The examples in this disclosure are used only for the clarity of the description and are not limiting on the illustrative embodiments. Additional or different information, data, operations, actions, tasks, events, activities, and manipulations will be conceivable from this disclosure for similar purposes and the same are contemplated within the scope of the illustrative embodiments.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
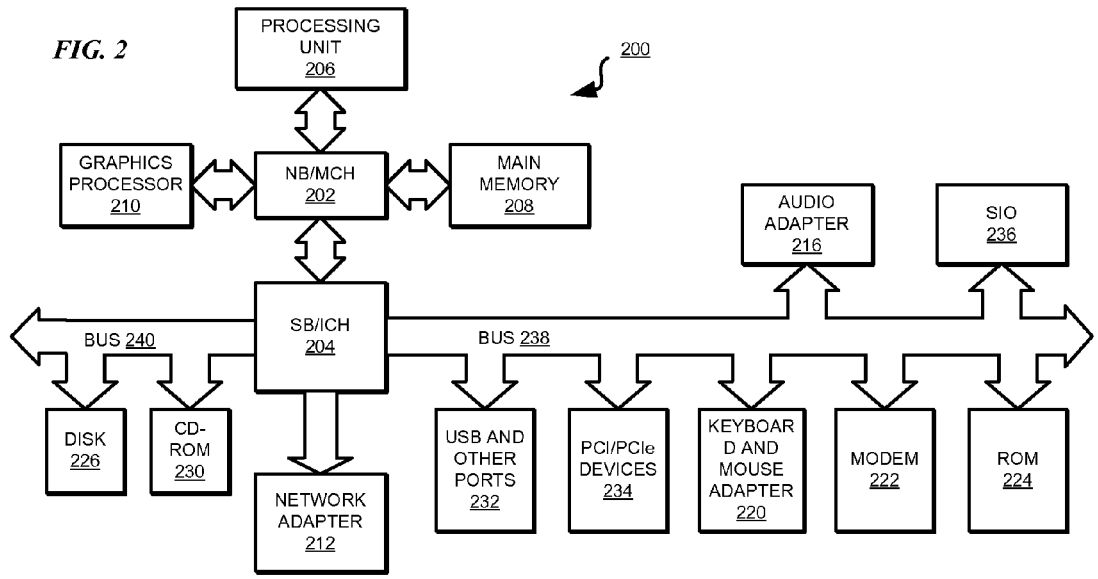
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Server 104 may include cluster 105. Cluster 105 may include instances of one or more analytic functions in accordance with an illustrative embodiment. Server 106 may include sources 107 and 109, client 112 may include source 113, and client 114 may include sources 115 and 117. A source, such as any of sources 107, 109, 113, 115, or 117, may emit a time series. Such a time series may serve as an input to an analytic function instance, such as but not limited to analytic function instances in example cluster 105.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client server environment in which the illustrative embodiments may be implemented. A client server environment enables software applications and data to be distributed across a network such that an application functions by using the interaction between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the business processes may be located for the illustrative embodiments.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations. In some configurations, processing unit 206 may include NB/MCH 202 or parts thereof.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). In some configurations, ROM 224 may be an Electrically Erasable Programmable Read-Only Memory (EEPROM) or any other similarly usable device. Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as AIX® (AIX is a registered trademark of International Business Machines Corporation in the United States, other countries, or both), Microsoft Windows (Microsoft and Windows are trademarks of Microsoft Corporation in the United States, other countries, or both), or Linux® (Linux is a registered trademark of Linus Torvalds in the United States, other countries, or both). An object oriented programming system, such as the Java™ programming system, may run in conjunction with the operating system and provides calls to the operating system from Java™ programs or applications executing on data processing system 200 (Java is a trademark of Sun Microsystems, Inc. or Oracle Corporation, in the United States, other countries, or both).

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
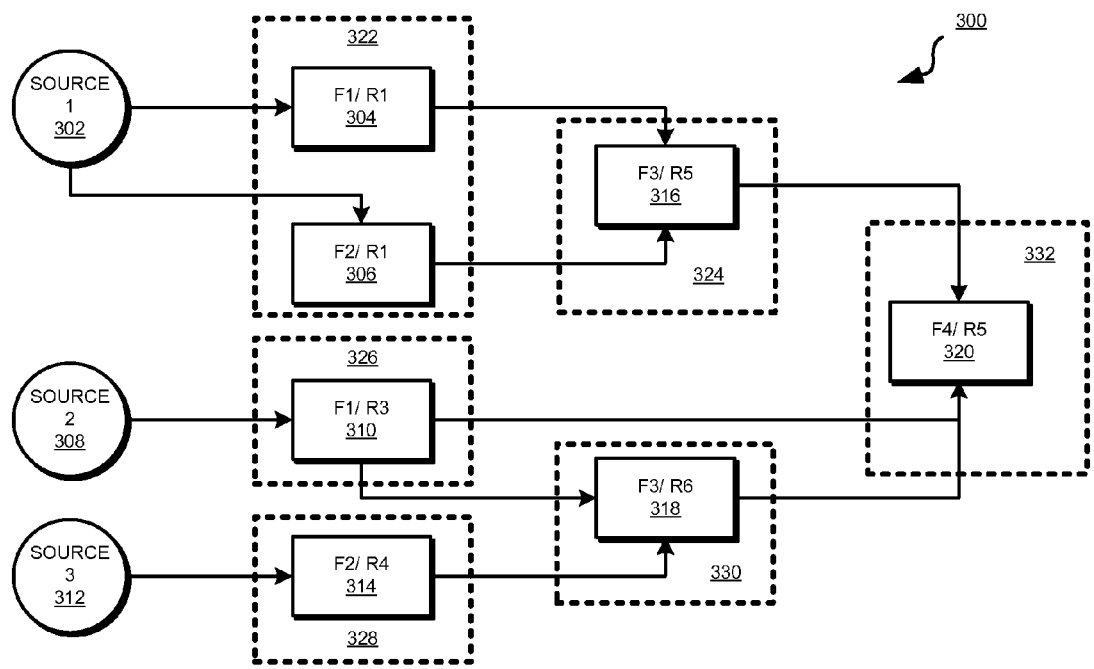
FIG. 3 depicts an object graph representation of analytic function clustering that can be improved upon using an illustrative embodiment.

With reference to FIG. 3, this figure depicts an object graph representation of analytic function clustering that can be improved upon using an illustrative embodiment. A clustering from object graph 300 may be implemented in a data processing system, such as client 110 in data processing environment 100 in FIG. 1.

A set of sources may provide data input to a set of analytic function instances. A set of sources is one or more sources. A set of instances or analytic function instances is one or more analytic function instances.

Source 302 labeled "Source 1" may be a data source providing a time series input to analytic function instance F1 304. Analytic function instance 304 may generate analytics for a resource R1 associated with source 302, and is therefore labeled F1/R1 accordingly.

Source 302 may also provide a time series input to analytic function instance F2 306. Analytic function instance 306 may generate different analytics for the resource R1 associated with source 302, and is therefore labeled F2/R1 accordingly.

Source 308 labeled "Source 2" may be another data source providing a time series input to another analytic function instance F1 310. Analytic function instance 310 may generate analytics for a resource R3 associated with source 308, and is therefore labeled F1/R3 accordingly.

Source 312 labeled "Source 3" may be another data source providing a time series input to another analytic function instance F2 314. Analytic function instance 314 may generate analytics for a resource R4 associated with source 312, and is therefore labeled F2/R4 accordingly.

Analytic function instances 304 and 306 are depicted as providing their output time series as inputs to analytic function instance 316, which may generate analytics for a resource R5 in the data processing environment. Analytic function instance 316 is therefore labeled F3/R5. Similarly, Analytic function instances 310 and 314 are depicted as providing their output time series as inputs to analytic function instance 318, which may be another instance of analytic function F3, generating analytics for a resource R6 in the data processing environment. Analytic function instance 318 is therefore labeled F3/R6.

Analytic function instances 316 and 318 are depicted as providing their output time series as inputs to analytic function instance 320, which may be an instance of analytic function F4, generating analytics for the resource R5. Analytic function instance 318 is therefore labeled F4/R5.

According to a present method of clustering analytic function instances, analytic function instances 304 and 306 would be clustered together in cluster 322 because of their dependence on source 302. The rationale behind such present clustering is that once source 302 becomes available and begins to transmit its time series, analytic function instances 304 and 306 can execute and perform their respective analytics even when other sources, such as any of sources 308 and 312, may not be transmitting.

In other words, the present clustering clusters those analytic function instances together that depend on a common source. As another example, cluster 324 would include analytic function instances 316 because analytic function instance 316 depends not on source 302, but on source analytic function instances 304 and 306. Similarly, cluster 326 would include only analytic function instance 310 because of analytic function instance 310's dependence on source 308. Cluster 328 would include only analytic function instance 314 because of analytic function instance 314's dependence on source 302. Cluster 330 would include only analytic function instance 318 because of analytic function instance 318's dependence on source analytic function instances 310 and 314. Cluster 332 would include only analytic function instance 320 because of analytic function instance 320's dependence on source analytic function instances 310, 316, and 318.

The invention recognizes, as is evident from FIG. 3, none of the clusters include analytic function instances that have dissimilar combinations of input time series from one another. As is also evident from the example in FIG. 3, seven depicted analytic function instances are clustered into six clusters and there is no substantial reduction in numbers achieved by such clustering. The invention recognizes that such a model would keep growing in the number of clusters as new combinations of analytic function instances with sources emerge in a given environment. The growing number of clusters is also referred to as label explosion in certain environments. Label explosion would at least become unmanageable, and in many cases, would also significantly degrade the system performance.

Figure 4:
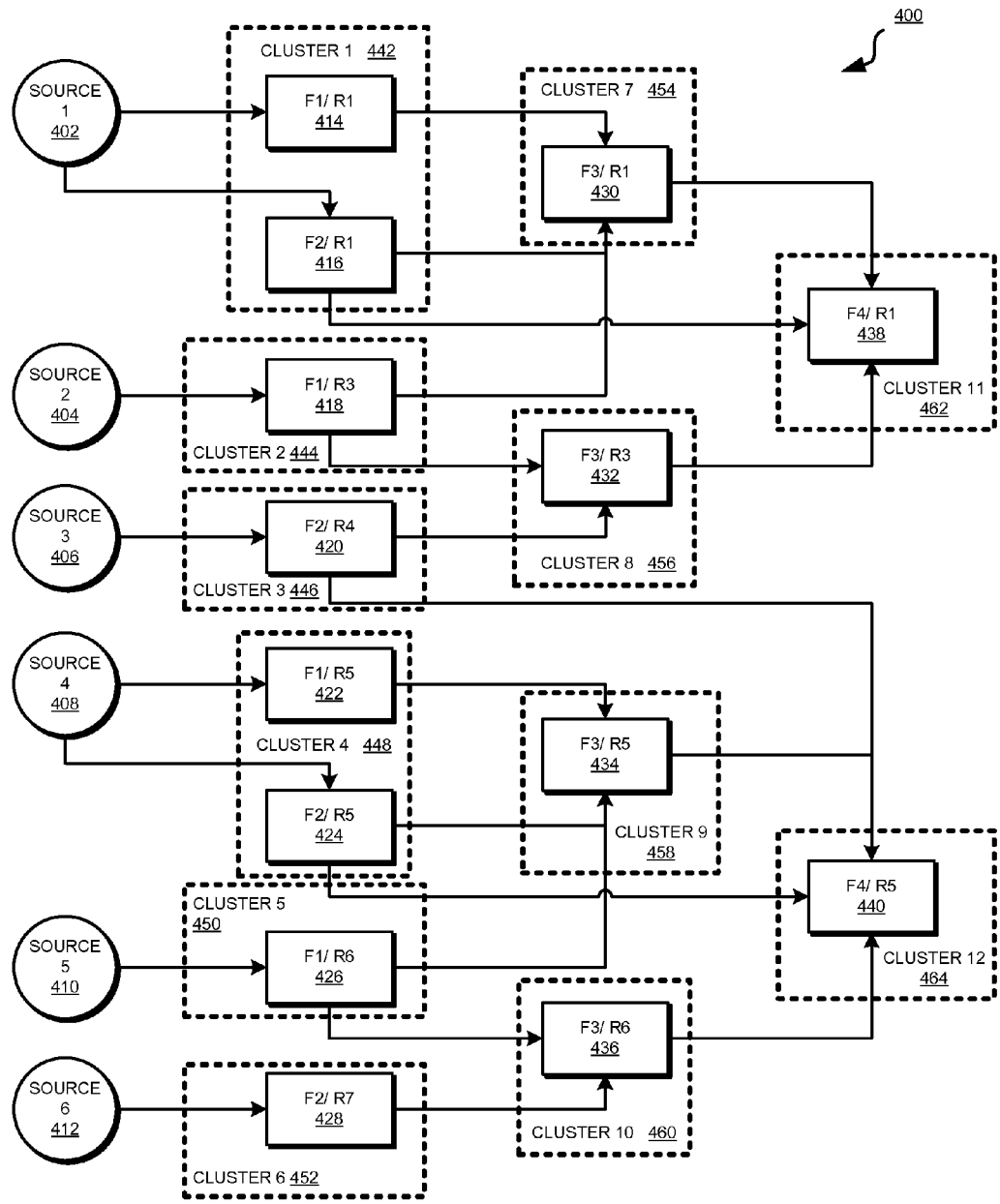
FIG. 4 depicts on a larger scale the problem described in FIG. 3, which can be alleviated by an illustrative embodiment.

With reference to FIG. 4, this figure depicts on a larger scale the problem described in FIG. 3, which can be alleviated by an illustrative embodiment. A clustering from object graph 400 may be implemented in a data processing system, such as client 110 in data processing environment 100 in FIG. 1.

In the manner described in FIG. 3, sources 402, 404, 406, 408, 410, and 412, provide time series inputs to analytic function instances 414, 416, 418, 420, 422, 424, 426, and 428 as depicted. Analytic function instances 430, 432, 434, 436, 438, and 440 receive input time series that are outputs of other analytic function instances.

Using a presently available method of clustering analytic function instances for reduced latency, the number of resulting clusters is almost as many as the number of analytic function instances shown. In the depicted example, fourteen analytic function instances are clustered in twelve clusters.

Figure 5:
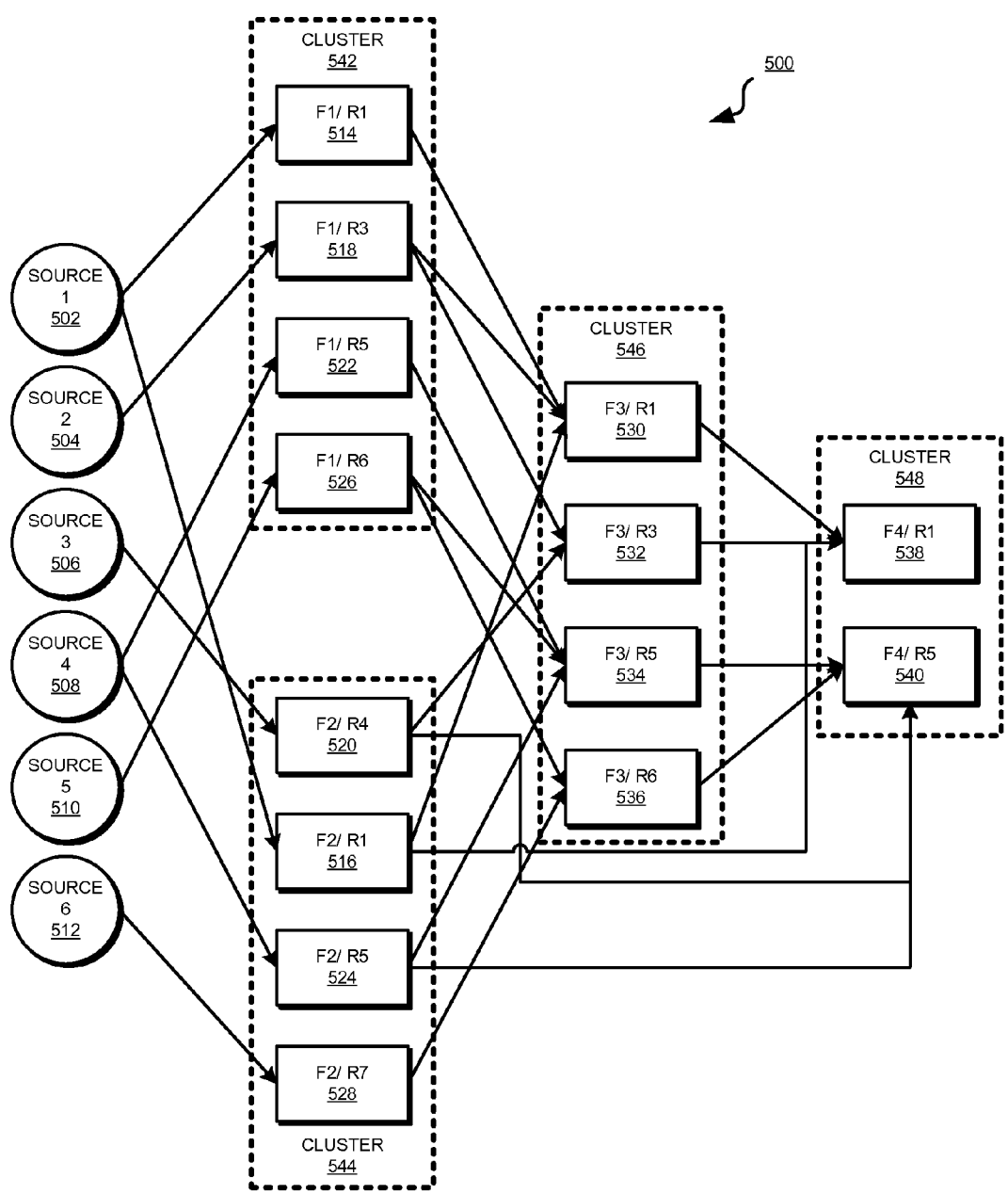
FIG. 5 depicts an improved clustering of analytic functions in accordance with an illustrative embodiment.

With reference to FIG. 5, this figure depicts an improved clustering of analytic functions in accordance with an illustrative embodiment. A clustering from object graph 500 may be implemented in a data processing system, such as shown in server 104 in data processing environment 100 in FIG. 1. Artifacts 502-540 in FIG. 5 correspond to artifacts 402-440 in FIG. 4 respectively.

All instances of a common analytic function are clustered together in one cluster. For example, as depicted, all instances of analytic function F1, to wit, analytic function instances 514, 518, 522, and 526, are clustered together in cluster 542 regardless of the sources from which they each receive their respective inputs. Similarly, all instances of analytic function F2, namely, analytic function instances 516, 520, 524, and 528, are clustered into cluster 544. Cluster 546 includes all instances of analytic function F3—analytic function instances 530, 532, 534, and 536. Cluster 548 includes all instances of analytic function F4, namely, analytic function instances 538 and 540.

Clustered in this manner, in one embodiment, a cluster may not begin execution until all sources for all the clustered analytic function instances therein are available and transmitting. For example, in such an embodiment, analytic function instance 514, which receives input from source 502, may have to wait when source 502 is available and transmitting but source 504 is not, because analytic function instance 518 is clustered with analytic function instance 514 in cluster 542.

Clustering analytic function instances in this manner is likely to increase latency when more than one sources supply the analytic function instances within a cluster. However, a significant reduction in the number of clusters may be observed in the data processing environment from such an embodiment. For example, FIG. 5 depicts only four clusters clustering fourteen analytic function instances, as compared to the twelve clusters of FIG. 4.

In another embodiment, the number of clusters may be further reduced from the depicted embodiment by combining analytic function instances of different analytic functions into a common cluster. For example, a cluster may be configured to manage a predetermined number of analytic function instances, for example, twelve (in implementation this number is likely to be much larger). Accordingly, a condition may be that the cluster can be populated with analytic function instances until that predetermined threshold capacity is reached in the cluster.

With such a condition operating in conjunction with the depicted embodiment, a process may determine that analytic function instances of analytic functions F1, F2, and F3 can be combined together into cluster 542 without violating the condition. Accordingly, analytic function instances, 514, 516, 518, 520, 522, 524, 526, 528, 530, 532, 534, and 536 may be assigned to cluster 542. Such an embodiment further reduces the total number of clusters while likely increasing the latency of the cluster due to the increased number of sources on which the analytic function instances of cluster 542 would now depend.

As another example, another condition may be that analytic function instances of those analytic functions may be clustered together which have more affinity to each other than with other analytic functions. For example, analytic function instances 538 and 540 of analytic function F4 receive inputs from analytic function instances 530, 532, 534, and 536 of analytic function F3 as well as from analytic function instances 516, 520, and 524 of analytic function F2, but from no analytic function instances of analytic function F1. Accordingly, analytic function F4 may be deemed to have affinity (or close affinity) with analytic functions F2 and F3, and no affinity (or distant affinity) with analytic function F1. An embodiment may therefore cluster analytic function instances 516, 520, 524, 528, 530, 532, 534, 536, 538, and 540 in one cluster and analytic function instances 514, 518, 522, and 526 in another cluster. Again, such an embodiment further reduces the total number of clusters while likely increasing the latency of the cluster due to the increased number of sources on which the analytic function instances of the larger cluster would now depend.

Another example condition may cluster the analytic function instances of diverse analytic functions such that the total computing resource consumption of the cluster remains at or below a threshold amount of computing resources allocated to the cluster. These example conditions are described here for clarity of the operation of various embodiments of the invention and are not intended to be limiting on the invention. Many other conditions will be apparent from this disclosure to those of ordinary skill in the art, and the same are contemplated within the scope of the invention.

Further note that a condition may be configured such that the condition must be satisfied by an analytic function whose instances are to be clustered with the instances of another analytic function. A condition may also be configured such that the condition must be satisfied by the analytic function instances that are to be clustered with the analytic function instances existing in a cluster.

In another example embodiment, certain logic that will be apparent from this disclosure to those of ordinary skill in the art may be used to initiate execution of a cluster when some but not all sources are available that provide inputs to the analytic function instances in a given cluster. Such an example embodiment could be envisioned as utilizing sub-clustering—clusters within clusters. Such an embodiment may still demonstrate increased latency over the clustering depicted in FIG. 4, but perhaps a smaller latency as compared to clustering described above in FIG. 5. Such an embodiment may also achieve a reduction in the total number of clusters as compared to the clustering example shown in FIG. 4. However, such sub-clustering may increase the number of clusters as compared to the embodiment depicted in FIG. 5. Thus, the sub-clustering embodiment may be a compromise to achieve some reduction in the number of clusters from the clustering in FIG. 5 with some increase in latency as compared to the clustering depicted in FIG. 4.

Figure 6:
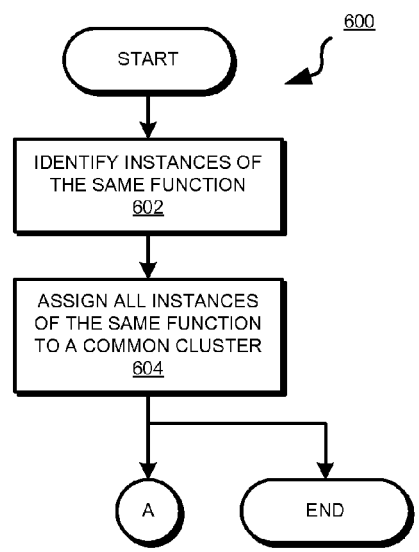
FIG. 6 depicts a flowchart of an example process for improved clustering of analytic function instances in accordance with an illustrative embodiment.

With reference to FIG. 6, this figure depicts a flowchart of an example process for improved clustering of analytic function instances in accordance with an illustrative embodiment. Process 600 may be implemented in a clustering application executing in a data processing system, such as in server 104 in FIG. 1.

Process 600 begins by identifying instances of a common analytic function (step 602). Process 600 assigns all instances of the same function to a common cluster (step 604). Process 600 may end thereafter, or may exit at exit point marked "A" to enter another process, such as process 700 in FIG. 7, having a corresponding entry point marked "A".

Figure 7:
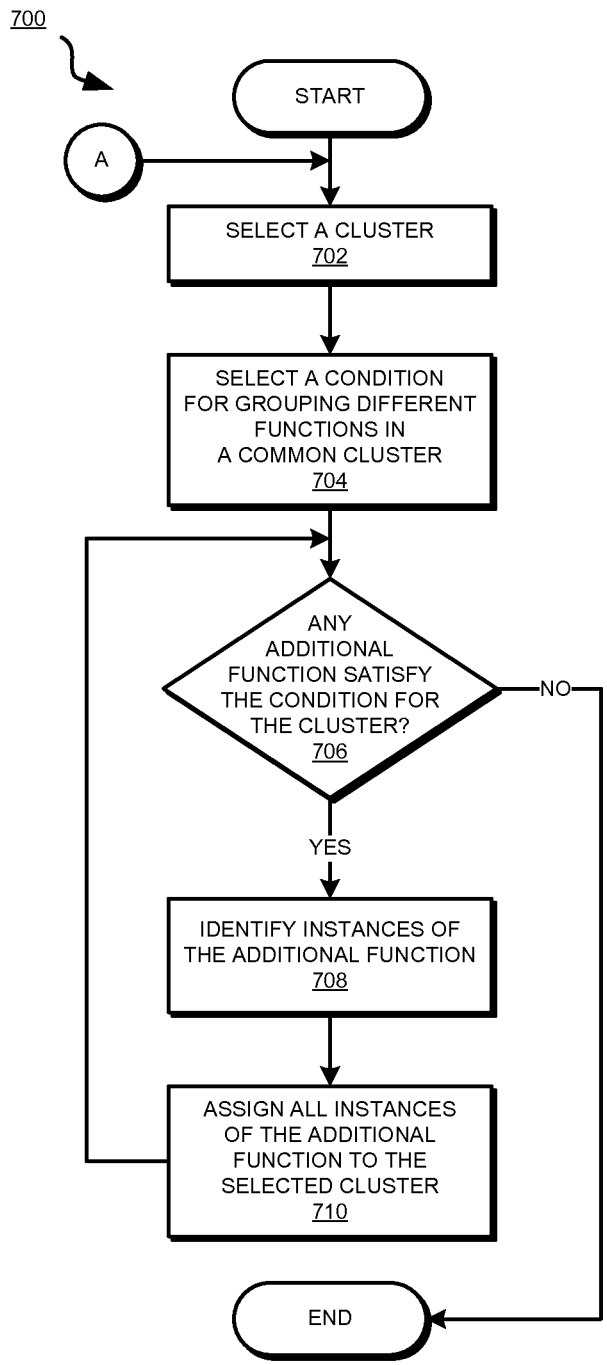
FIG. 7 depicts an example additional process for improved clustering of analytic function instances in accordance with an illustrative embodiment.

With reference to FIG. 7, this figure depicts an example additional process for improved clustering of analytic function instances in accordance with an illustrative embodiment. Process 700 may be implemented in a clustering application executing in a data processing system, such as in server 104 in FIG. 1.

Process 700 begins by selecting a cluster (step 702). Another process, such as process 600 in FIG. 6, may enter process 700 at step 702 via entry point marked "A".

Process 700 selects a condition for grouping different analytic functions in a common cluster (step 704). Process 700 determines whether any additional function satisfies the condition for inclusion in the selected cluster (step 706). If such an analytic function exists ("Yes" path of step 706), process 700 identifies all instances of that additional function (step 708). Process 700 assigns all instances of the additional function to the selected cluster (step 710). Process 700 may end thereafter. If no additional function satisfies the condition for inclusion in the selected cluster ("No" path of step 706), process 700 may exit thereafter as well.

Note that over a period of operation of data processing systems in a given data processing environment, new instances of various analytic functions may be created. Processes 600 in FIG. 6 or 700 in FIG. 7 may execute more than once to assign or reassign analytic function instances to various new or existing clusters. Furthermore, an implementation may use a set of conditions from which to select one or more conditions to assign an analytic function instance to a cluster. Different conditions or combinations thereof may be used for assigning analytic function instances of different analytic functions, assigning to different clusters, or both.

The components in the block diagrams and the steps in the flowcharts described above are described only as examples. The components and the steps have been selected for the clarity of the description and are not limiting on the illustrative embodiments. For example, a particular implementation may combine, omit, further subdivide, modify, augment, reduce, or implement alternatively, any of the components or steps without departing from the scope of the illustrative embodiments. Furthermore, the steps of the processes described above may be performed in a different order within the scope of the illustrative embodiments.

Thus, a computer implemented method, apparatus, and computer program product are provided in the illustrative embodiments for improved clustering of analytic function instances in a data processing environment. Using an embodiment of the invention, the number of clusters, processes, or labels can be reduced significantly in the data processing environment while suffering some acceptable level of increased latency. An embodiment may allow the improved clusters to be further organized via conditions to tune the number of labels and latency in the environment.

As the amount of data available to enterprises and other organizations dramatically increases, more and more companies are looking to turn this data into actionable information and knowledge. Addressing these requirements requires systems and applications that enable efficient extraction of knowledge and information from potentially enormous volumes and varieties of continuous data streams. Therefore, an embodiment of the invention may be particularly useful in, but may not be limited in use to, a stream processing system.

The invention can take the form of an entirely software embodiment, or an embodiment containing both hardware and software elements. In a preferred embodiment, the invention is implemented in software or program code, which includes but is not limited to firmware, resident software, and microcode.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code. A client data processing system may download that computer usable code, such as for storing on a data storage medium associated with the client data processing system, or for using in the client data processing system. The server data processing system may similarly upload computer usable code from the client data processing system. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A computer implemented method for improved clustering of analytic functions in a data processing environment, the computer implemented method comprising:
    identifying a set of instances of an analytic function receiving data input from a set of data sources, a first subset of instances configured to receive input from a first subset of data sources, and a second subset of instances configured to receive input from a second subset of data sources, wherein the analytic function is described by an analytic function specification, an instance in the set of instances executing in the data processing environment, and wherein the analytic function performs an analytical computation when the instance executes in the data processing environment;
    assigning the set of instances to a cluster, wherein the cluster is a process within which the set of instances are configured to execute, and wherein the instances in the set of instances satisfy a condition; and
    beginning executing the cluster in a computer in the data processing environment when the first subset of data sources begins transmitting time series data input to the first subset of instances in the cluster.

2. The computer implemented method of claim 1, further comprising:
    selecting a condition for clustering sets of instances of different analytic functions in the cluster;
    selecting a second analytic function having a second set of instances according to the condition;
    assigning the second set of instances to the cluster.

3. The computer implemented method of claim 2, wherein the second analytic function satisfies the condition.

4. The computer implemented method of claim 3, wherein to satisfy the condition, the second analytic function has greater affinity to the analytic function as compared to affinity to a third analytic function.

5. The computer implemented method of claim 2, wherein the second set of instances satisfies the condition.

6. The computer implemented method of claim 5, wherein to satisfy the condition, total number of instances in the first and second sets of instances does not exceed a threshold capacity of the cluster.

7. The computer implemented method of claim 1, wherein the beginning executing the cluster occurs when the second subset of data sources also begins transmitting time series data input to the second subset of instances in the cluster.

8. A computer program product comprising a computer usable storage device including computer usable code for improved clustering of analytic functions in a data processing environment, the computer usable code comprising:
    computer usable code for identifying a set of instances of an analytic function receiving data input from a set of data sources, a first subset of instances configured to receive input from a first subset of data sources, and a second subset of instances configured to receive input from a second subset of data sources, wherein the analytic function is described by an analytic function specification, an instance in the set of instances executing in the data processing environment, and wherein the analytic function performs an analytical computation when the instance executes in the data processing environment;
    computer usable code for assigning the set of instances to a cluster, wherein the cluster is a process within which the set of instances are configured to execute, and wherein the instances in the set of instances satisfy a condition; and
    computer usable code for beginning executing the cluster in a computer in the data processing environment when the first subset of data sources begins transmitting time series data input to the first subset of instances in the cluster.

9. The computer program product of claim 8, further comprising:
    computer usable code for selecting a condition for clustering sets of instances of different analytic functions in the cluster;
    computer usable code for selecting a second analytic function having a second set of instances according to the condition;
    computer usable code for assigning the second set of instances to the cluster.

10. The computer program product of claim 9, wherein the second analytic function satisfies the condition.

11. The computer program product of claim 10, wherein to satisfy the condition, the second analytic function has greater affinity to the analytic function as compared to affinity to a third analytic function.

12. The computer program product of claim 9, wherein the second set of instances satisfies the condition.

13. The computer program product of claim 12, wherein to satisfy the condition, total number of instances in the first and second sets of instances does not exceed a threshold capacity of the cluster.

14. The computer program product of claim 8, wherein the beginning executing the cluster occurs when the second subset of data sources also begins transmitting time series data input to the second subset of instances in the cluster.

15. The computer program product of claim 8, wherein the computer usable code is stored in a computer readable storage medium in a data processing system, and wherein the computer usable code is transferred over a network from a remote data processing system.

16. The computer program product of claim 8, wherein the computer usable code is stored in a computer readable storage medium in a server data processing system, and wherein the computer usable code is downloaded over a network to a remote data processing system for use in a computer readable storage medium associated with the remote data processing system.

17. A data processing system for improved clustering of analytic functions in a data processing environment, the data processing system comprising:

a storage device including a storage medium, wherein the storage device stores computer usable program code; and a processor, wherein the processor executes the computer usable program code, and wherein the computer usable program code comprises:

computer usable code for identifying a set of instances of an analytic function receiving data input from a set of data sources, a first subset of instances configured to receive input from a first subset of data sources, and a second subset of instances configured to receive input from a second subset of data sources, wherein the analytic function is described by an analytic function specification, an instance in the set of instances executing in the data processing environment, and wherein the analytic function performs an analytical computation when the instance executes in the data processing environment;

computer usable code for assigning the set of instances to a cluster, wherein the cluster is a process within which the set of instances are configured to execute, and wherein the instances in the set of instances satisfy a condition; and computer usable code for beginning executing the cluster in a computer in the data processing environment when the first subset of data sources begins transmitting time series data input to the first subset of instances in the cluster.

18. The data processing system of claim 17, further comprising:

computer usable code for selecting a condition for clustering sets of instances of different analytic functions in the cluster;

computer usable code for selecting a second analytic function having a second set of instances according to the condition;

computer usable code for assigning the second set of instances to the cluster.

19. The data processing system of claim 18, wherein the second analytic function satisfies the condition.

20. The data processing system of claim 19, wherein to satisfy the condition, the second analytic function has greater affinity to the analytic function as compared to affinity to a third analytic function.

\* \* \* \* \*